United States Patent [19]
Tribbett

[11] Patent Number: 6,164,419
[45] Date of Patent: Dec. 26, 2000

[54] MECHANICAL SEAT LOCK WITH TRANSLATING ROD THAT DOES NOT ROTATE

[75] Inventor: Kevin N. Tribbett, Noblesville, Ind.

[73] Assignee: P. L. Porter Co., Westfield, Ind.

[21] Appl. No.: 09/295,920

[22] Filed: Apr. 21, 1999

[51] Int. Cl.$^7$ .................................................. B65H 59/10
[52] U.S. Cl. ........................................ 188/67; 188/77 W
[58] Field of Search .................................. 188/67, 77 W, 188/265, 77 R; 297/375, 374, 3, 362.14; 74/531

[56] References Cited

U.S. PATENT DOCUMENTS

| | | | |
|---|---|---|---|
| 3,874,480 | 4/1975 | Porter et al. | 188/67 |
| 5,010,983 | 4/1991 | Kitamura | 188/67 |
| 5,150,771 | 9/1992 | Porter | 188/67 |
| 5,794,470 | 8/1998 | Stringer | 188/67 X |

*Primary Examiner*—Douglas C. Butler
*Attorney, Agent, or Firm*—Oppenheimer Wolff & Donnelly LLP

[57] ABSTRACT

The mechanical lock includes a rod having one end extending into a housing and another end extending out of the housing. The rod translate through bores through bushings within the housing. Coil springs in the housing and surround the rod. When the springs are in their normal orientation, they grip the rod tightly and prevent the rod from translating. The rod and bushings have complementary structure for preventing the rod from rotating within the bushings and housing. In the exemplary embodiment, the structure are flat surfaces along the rod and the bushing that mate with each other.

13 Claims, 4 Drawing Sheets

MECHANICAL SEAT LOCK WITH TRANSLATING ROD THAT DOES NOT ROTATE

BACKGROUND OF THE INVENTION

1. Field of the Invention

The present invention generally relates to mechanical locks that are primarily used for vehicle seats, and particularly relates to the type of lock in which a rod translates axially within a housing.

2. State of the Art

Mechanical locks allow parts to move relative to each other and to lock them together when necessary. Adjustable vehicle seats commonly use this type of lock for controlling seat elevation and tilt angle. They also lock the seat on horizontal rails to position the seat from a steering wheel or an accelerator or brake pedal. Examples of such locks include Porter, U.S. Pat. No. 5,150,771 (1992), "Coil Spring or Friction-Lock Mechanisms," and Stringer, U.S. Pat. No. 5,794,470 (1998), "Mechanical Seat Lock."

The Porter lock includes a housing, a rod that can slide axially through the housing, and coil springs that are fixed within the housing and extended around the rod. The springs have a normal inside diameter for gripping the rod surface and locking the rod against longitudinal movement through the housing. The springs' grip on the rod also somewhat limits the rod from rotating.

The rod's surface may be finely scored in a direction generally transverse to the rod's longitudinal axis. The springs have surfaces roughened to an extent comparable to the rod's surface. The springs' surfaces have fine transverse score lines that are generally parallel to the score lines on the rod's surface. Transverse score lines on the springs mate with score lines on the rod's surface to prevent the rod's longitudinal movement through the springs and the housing. The transverse score lines on the springs and the rod do little to prevent of the rod's rotational movement.

The Stringer mechanical lock includes a rod that can move longitudinally within an elongated, tubular housing. The housing or rod attaches to a fixed vehicle part, and the other attaches to a part that can be moved. A pair of coil locking spring within the housing are around the rod. The normal diameter of each coil spring is slightly less than the outside diameter of the rod. Thus, the springs, in their normal state, provides a tight grip on the rod. The housing limits longitudinal movement of the springs. Consequently, the springs limit the longitudinal movement of the rod. Also, the grip of the coil springs on the rod somewhat limits the rod from rotating.

The Stringer mechanical lock also includes two end bushings. Each end bushing is at an end of one coil spring. Each bushing has an axial bore to support the rod and permit it to slide through the housing. Each bushing may also have an angled surface adjacent to the locking spring. When a large axial load is applied to the rod, the rod pulls one coil spring against the bushing's angled surface. This action cants the coil spring and changes the spring's normal or natural circular shape, thereby increasing the spring's frictional force on the rod and further limiting the rod's longitudinal movement In sum, the mechanical locks in both Porter and Stringer include coil springs that provide tight grips on their corresponding rods to limit the rods' longitudinal and rotational movements. These mechanical locks also include additional mechanisms to further limits the longitudinal movement of its rod when large loads are applied.

The prior art does not include additional structure to prevent rotational movement of the rod. Accordingly, when a sufficiently large load is applied, the rod may rotate in a direction which may cause the rod to move longitudinally in relation to the coil springs and housing. Rod rotation can decrease the maximum load for any mechanical lock.

Not all mechanical locks have cylindrical rods. Some have square or rectangular rods that translate within a mating grove in a housing. J. Zhuang, Patent Application Ser. No. 09/088,212, filed May 29, 1998, "Mechanical Lock With A Cam-Driven Locking Pawl," discloses such a lock. Those shapes limit rod rotation. However, the Zhuang lock does not use coil springs to lock the rod in the housing.

Thus, it is desirable to prevent the rod from rotating within the housing.

SUMMARY OF THE INVENTION

The principal goal of the present invention is to disclose and provide an improved mechanical lock with additional structure to prevent the rod of a mechanical lock from rotating within the lock's housing. A further object is to prevent rod rotation in a compact, inexpensive structure. Another object is to allow structure from existing mechanical locks to be modified slightly to prevent rod rotation.

The mechanical lock of the present invention includes a housing, a rod, coil springs, and end bushings. The rod has one end extending into the housing and another end extending out of the housing. The rod does not have a perfect cylindrical cross section. Rather, the rod's outer surface includes non-cylindrical regions or rotation obstructions that extend along the rod's longitudinal axis or substantially the rod's length. These rotation obstructions limit rotational movement of the rod. In the exemplary embodiment, the rotation obstructions are flat portions on the rod's outer surface. The rotation obstructions may alternatively be grooves, score lines, bulges or other hindrances.

A pair of coil springs attach to the housing and extend around the rod to grip the rod and prevent longitudinal movement.

A pair of end bushings, which are fixed in the housing, have bores through which the rod translates. The bores give the bushings inner surfaces that correspond to the rod's outer surface. Non-cylindrical regions or rotation prevention irregularities are formed on inner surfaces of the bushings to engage the rotation obstructions formed on the rod's outer surface. This engagement limits the rotational movement of the rod. In the exemplary embodiment, irregularities formed on the bushings' inner surfaces are flat areas, and rotation obstructions on the outer surface of the rod are flat portions extending longitudinally for the rod's length. When the rod passes through the bushings' axial bores, flat areas on the bushings' inner surfaces engage corresponding flat portions on the outer surface of the rod to prevent the rod from rotating within the housing.

These and other features and attendant advantages of the present invention will become apparent by referring the following detailed description and the accompanying drawings.

DETAILED DESCRIPTION OF EXEMPLARY EMBODIMENTS

Figure 1:
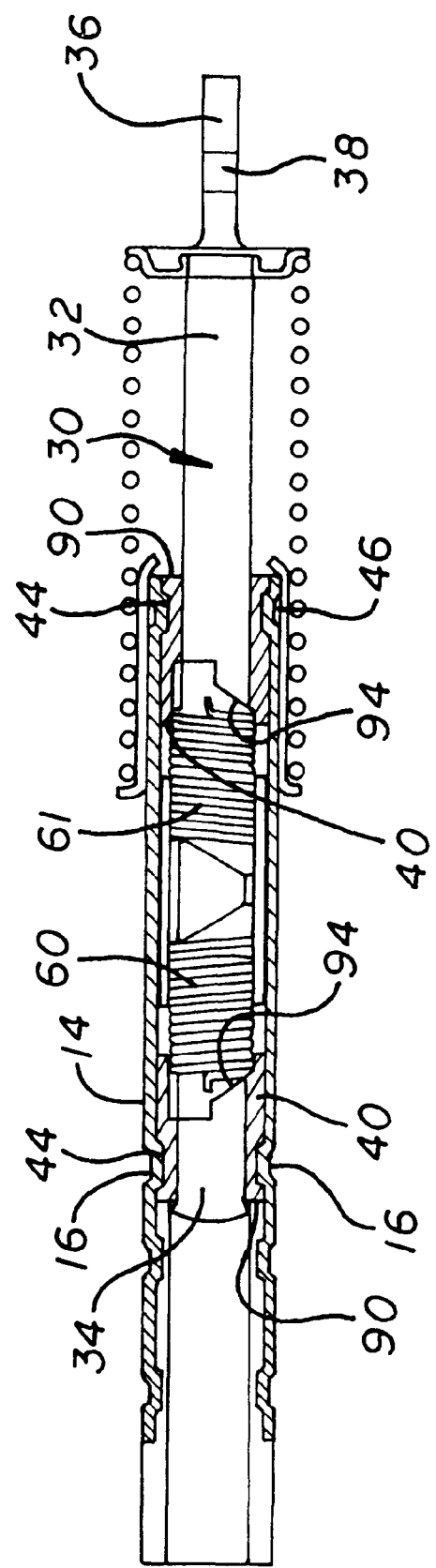
FIG. 1 shows a side, sectional view of the improved mechanical lock in accordance to the present invention.
Figure 2:
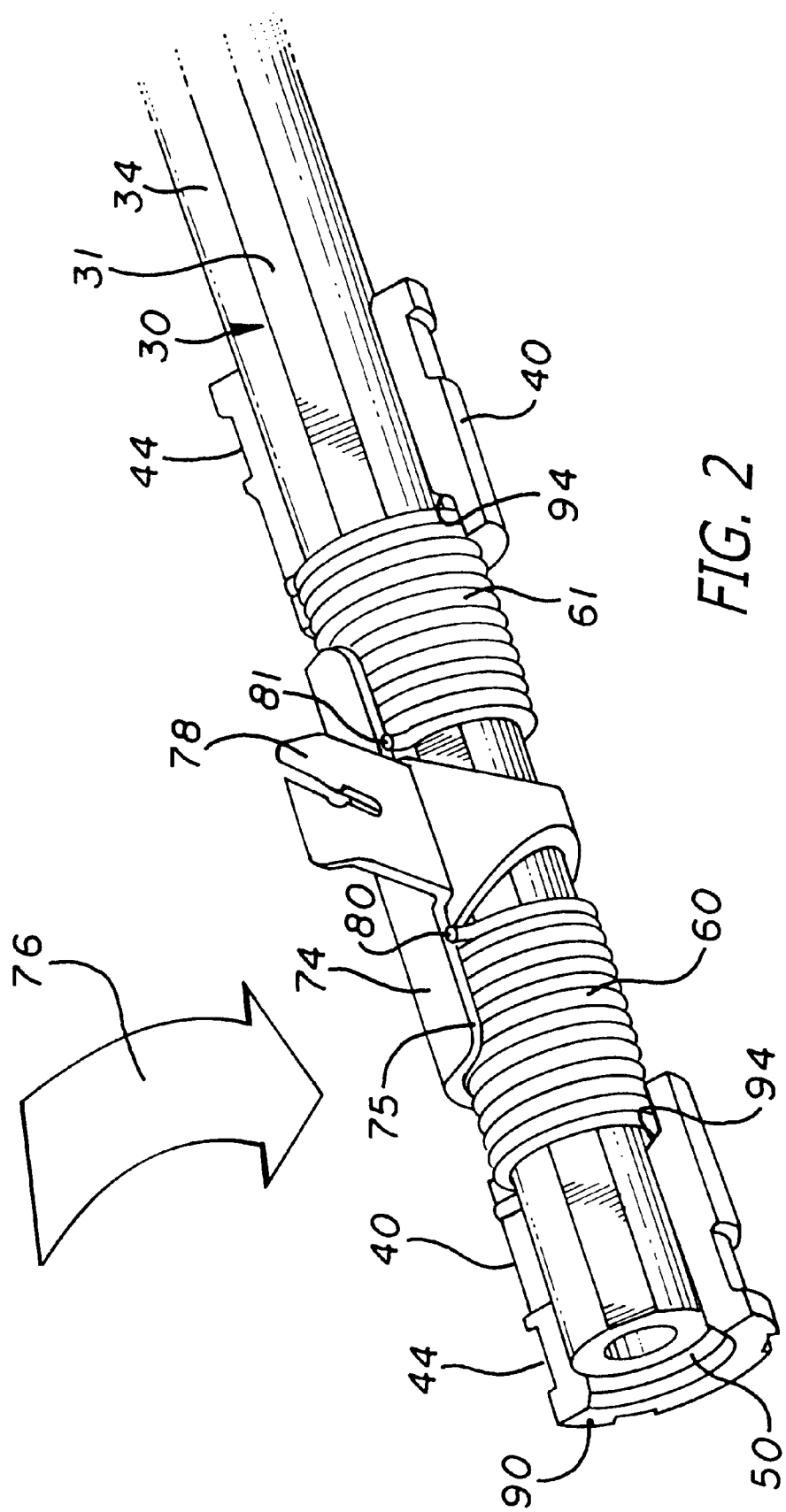
FIG. 2 illustrates a perspective, partially cut away view of the improved mechanical lock shown in FIG. 1.
Figure 3:
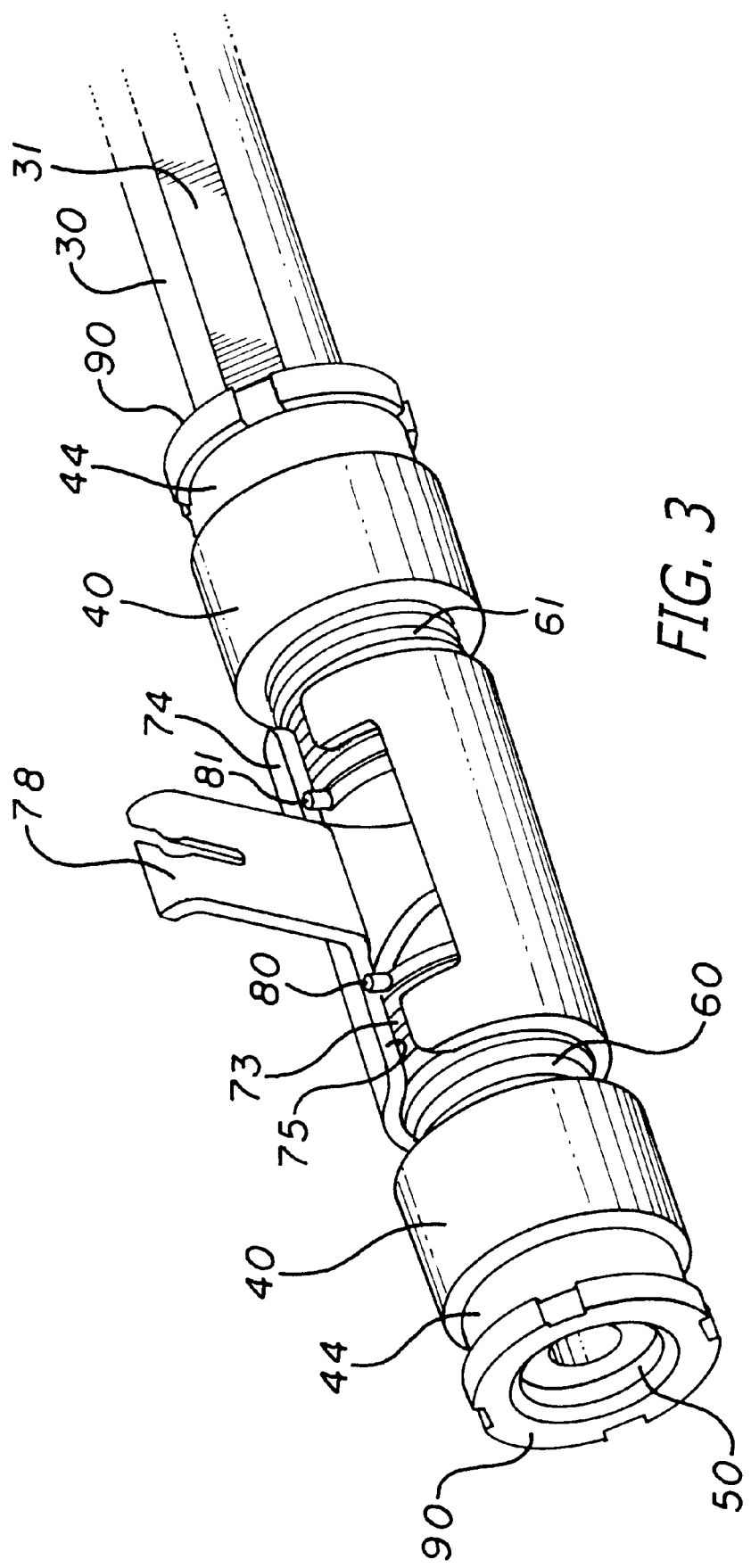
FIG. 3 shows another partially cut away perspective view of the improved mechanical lock shown in FIG. 1.

The mechanical lock 10 of the present invention includes a housing 14. The housing 14 may be formed of steel tubing. In the exemplary embodiment, the housing has an outer diameter (OD) of approximately 25.4 mm, an inner diameter (ID) of about 21.18 mm, and a length of approximately 298 mm (FIGS. 1–3). It should be noted, however, that the dimensions of the housing 14 will vary depending on the application.

The housing shown is similar to that shown in the previously-mentioned Stringer patent. Porter and Sember, U.S. Pat. No. 3,874,480 (1975), "Friction Brake Mechanism," Porter, U.S. Pat. No. 4,577,730 (1986), "Mechanical Lock," and Porter and Babiciuc, U.S. Pat. No. 5,219,045 (1993), "Linear Mechanical Lock with One-Piece Lock Housing," and Porter, U.S. Pat. No. 5,150,771 (1992) "Coil Spring Or Friction Lock Mechanisms," each show different housings for mechanical locks. Their disclosures are incorporated by reference.

The mechanical lock 10 also includes a pair of coil locking springs 60 and 61. In the exemplary embodiment, each locking spring 60 and 61 is wound from 1.575 mm music wire into 16¾ coils. The number of coils in the locking spring varies depending on the size of the housing 14. When not assembled, the ID of the locking springs is slightly less than the OD of the rod 30.

Therefore, when the rod 30 extends through the locking springs 60 and 61, they grip the rod 30 tightly and limit the rod's longitudinal movement. The springs' grip on the rod also limits the rod's rotational movement.

The mechanical lock 10 further includes a lever fitting 74 which forms a tubular ring round portions of the locking springs 60 and 61 (FIGS. 2 and 3). A lever 78 is connected and bent outward from the lever fitting 74.

Figure 6:
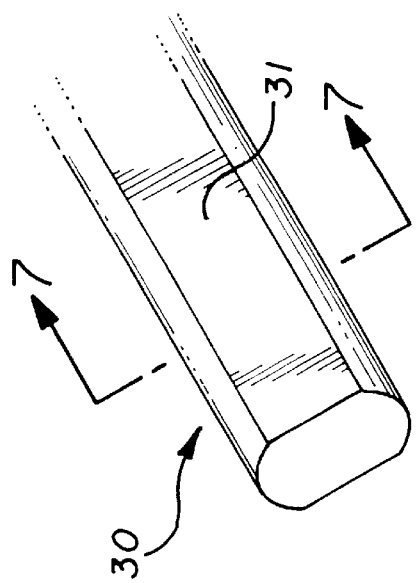
FIG. 6 illustrates a partially cut away perspective view of a rod.
Figure 7:
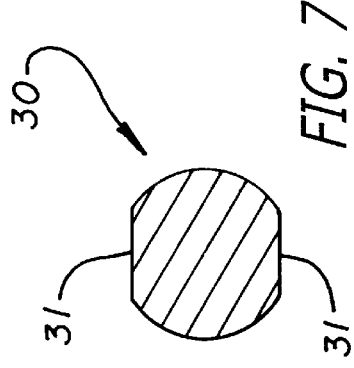
FIG. 7 shows a cross-sectional view taken along line 7—7 of FIG. 6.
Figure 4:
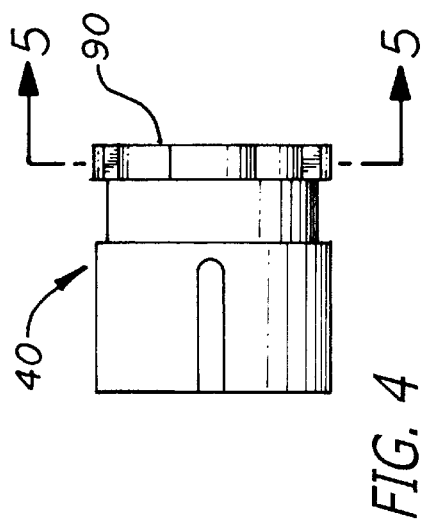
FIG. 4 illustrates a side, elevational view of an end bushing.

The mechanical lock 10 also includes a rod 30 (FIGS. 1–3). The rod 30 has a first end 32 extending into the housing 14 and a second end 34 extending out of the housing 14. The second end 34 of the rod 30 is flattened into a flange 36 (FIG. 1). The flange 36 has a hole 38 for fastening the rod to part of a vehicle seat (not shown). The rod 30 may be hollow (as shown FIGS. 2 and 3), or solid (as shown in FIGS. 6 and 7). The rod 30 has a general OD of approximately 12.7 mm. However, the outer surface of the rod 30 has non-cylindrical regions or rotation obstructions extending longitudinally for substantially the length of the rod 30. The rotation obstructions serve as means to limit the rod's 30 rotational movement.

In the exemplary embodiment, the rod 30 includes two flat portions 31 that are generally 180° from each other (FIGS. 2, 3, 6 and 7). These flat portions 31 extend longitudinally on the outer surface of the rod 30 for substantially the length of the rod 30 (FIGS. 2 and 3). The rotation obstructions may alternatively be grooves, score lines, bulges or other surface hindrances designed to obstruct the rod's rotational movement within the housing.

Figure 5:
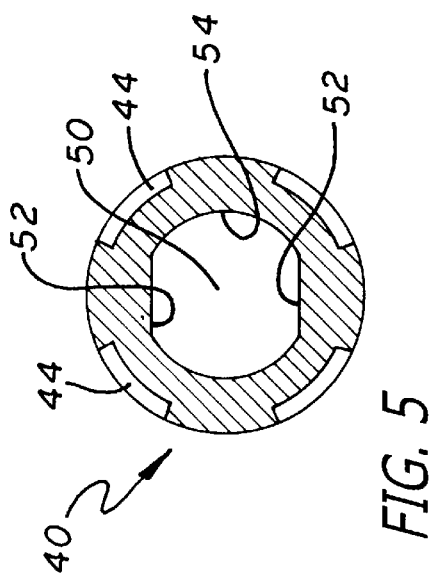
FIG. 5 shows a cross-sectional view taken along line 5—5 of FIG. 4.

Housing 14 receives a pair of end bushings 40. In the exemplary embodiment, the bushings have an OD of 21.08 mm, an ID of 16.14 mm, and a length of 22.86 mm. Each bushing has a circumferential groove 44. The dimples 16 in the housing 14 engage the circumferential grooves 44 of the bushings, and secure the bushings in place. Each bushing also has a central, axially aligned bore 50 (FIGS. 2, 3, and 5). The ID diameter of each bore 50 is slightly greater than the rod's OD such that the rod may pass through the bore. The bore gives each busing 40 an inner surface 54.

Each bushing 40 also has an outer end face 90 and an inner end face 94. The outer end face 90 is perpendicular to the longitudinal axis of the rod 30, but the inner end face 94 is angled at about 55° to 65° or more to the same axis. The coil locking springs 60 and 61 have a natural helical angle. The angle of the bushings' inner end faces 94 is a substantially greater acute angle than the natural helical angle of the springs 60 and 61. The Stringer patent explains the advantages of the angled faces.

The coil locking springs 60 and 61 are adapted to prevent the rod 30 from moving in longitudinal direction. The coil locking springs in their normal or natural position are not unwound or uncoiled so they tightly grip the rod. Thus, under a relatively small axial load to the rod, e.g., a load transmitted from a car seat during a sudden stop, the locking springs grip the rod to prevent the rod from moving longitudinally. At higher loads, the coil springs 60 and 61 begin canting as the load urges the rod 30. The canting increases the coil's grip on the rod. If, under higher loads, the coil springs 60 and 61 begin moving in the housing with the rod, one of the locking springs will push against the angled inner end face 94 of the corresponding bushing 40. The angle of the inner end face 94 of the corresponding bushing causes the spring 60 or 61 to can't even further. The spring's natural circular shape 60 becomes more elliptical, which increases the force that the spring applies to the rod. Consequently, the spring grips the rod 30 more tightly and further limits the longitudinal movement of the rod.

As stated above, the springs' grip on the rod somewhat limits the rod's rotational movement. The mechanical lock 10 has an additional rotational preventive structure to prevent the rod from rotating further when a large load is placed on the rod 30. The bushings 40 and the rod 30 work in cooperation to provide the structure. As mentioned above, non-cylindrical regions or rotation obstructions are formed on the rod's outer surface. These rotation obstructions extend longitudinally for substantially the rod's length and further limit the rotational movement of the rod. Also, each end bushing has non-cylindrical regions or rotation prevention irregularities on its inner surface 54. When the rod passes through the bores of the bushings, the irregularities on the inner surfaces of the bushings engage the rotation obstructions 31 on the outer surface of the rod 30 and prevent the rod from rotating.

In the exemplary embodiment, the rotation obstructions on the rod's outer surface are two flat portions 31 formed approximately 180° from each other (FIGS. 6 and 7). These flat portions 31 extend longitudinally for substantially the length of the rod (FIG. 6). The corresponding rotation prevention irregularities on the inner surfaces of the bushings 40 are two flat areas 52 formed approximately 180° from each other. When the rod passes through the bores 50 of the bushings, the flat portions 31 on the outer surface of the rod engage the flat areas 52 on the inner surface 54 of the bushings 40, thereby prevent the rod 30 from rotating.

The rotation obstructions on the rod's outer surface may alternatively be grooves, longitudinal score lines, bulges or other surface hindrances designed to obstruct the rod's rotational movement. Also, the rotation prevention irregularities on inner surfaces of the bushings alternatively may be protrusions to mate with the rod's surface grooves, score lines to interlock with the longitudinal score lines on the rod's surface, or indents to receive the rod's bulges.

The mechanical lock 10 further includes a lever 78. This lever connects to a remote handle (not shown) that the user can reach. To adjust the longitudinal position of the rod, a user applies torque to the lever in the clockwise direction (illustrated by arrow 76 in FIG. 2). This causes the wall 75 of groove 73 (FIG. 3) in the lever fitting 74 to rotate spring tangs 80 and 81 clockwise. The clockwise movement of the spring tangs 80 cause the coil locking springs to unwind or uncoil slightly. The slight unwinding or uncoiling of each spring sufficiently increases the spring's inside diameter and loosen the spring's grip on the rod. The rod 30 can then be moved in the longitudinal direction.

The drawings do not show it, but the mechanical lock of the present invention may have a central bushing. That bushing has a bore through which the rod 30 traverses. The bore may or may not include opposing flat surfaces or other rotation-inhibiting structure.

Although the present invention has been described in terms of the exemplary embodiment, modifications or additions to the above-described exemplary embodiments would be readily apparent to one skilled in the art. For example, rotation prevention irregularities may be formed on the inner surfaces or rod contacting surfaces of the springs such that the irregularities engage the rotation obstructions on the surface of the rod when the rod is passed through the spring. This engagement would further prevent the rod from rotating. Accordingly, the present invention is not limited to the specific embodiment illustrated and described hereinabove.

I claim:

1. An improved mechanical seat lock comprising:
   an elongated housing;
   at least one bushing in the housing, each bushing having a generally cylindrical inner surface;
   a rod having a generally cylindrical outer surface, the rod extending through the bushing and at least partially through the housing, the inner surface of the bushing supporting the rod for translation relative to the housing;
   at least one locking spring within the housing, around the rod and adjacent the bushing, the normal inside diameter of each locking spring being less than the outside diameter of the rod and moveable to an uncoiled orientation having a diameter at least slightly greater than the outside diameter of the rod;
   the outer surface of the rod having at least one non-cylindrical region extending longitudinally along the rod; and
   the inner surface of at least one bushing having at least one non-cylindrical region that conforms to the non-cylindrical region on the outer surface of the rod.

2. An improved mechanical seat lock as claimed in claim 1, wherein:
   each non-cylindrical region on the outer surface of the rod is a flat portion that extends longitudinally along the rod; and
   each non-cylindrical region on the inner surface of the bushing is a flat area that engages the flat portion to limit rotational movement of the rod.

3. An improved mechanical seat lock as claimed in claim 1, wherein:
   the outer surface of the rod has two non-cylindrical regions that extend longitudinally along the rod; and
   the inner surface of the bushing has two non-cylindrical regions that conform to the non-cylindrical regions on the outer surface of the rod.

4. An improved mechanical seat lock as claimed in claim 3, wherein:
   the non-cylindrical regions on the outer surface of the rod are flat portions; and
   the non-cylindrical regions on the inner surface of the bushing are flat areas that engage the flat portions to limit rotational movement of the rod.

5. An improved mechanical seat lock as claimed in claim 4, wherein:
   the flat portions are formed on the outer surface of the rod approximately 180° from each other; and
   the flat areas are formed on the inner surface of the rod approximately 180° from each other.

6. An improved mechanical seat lock as claimed in claim 1, wherein:
   the locking spring has an inner surface that contacts the outer surface of the rod; and
   the inner surface of the spring has at least one non-cylindrical region that conforms to and engages the non-cylindrical region on the outer surface of the rod to limit the rotational movement of the rod.

7. An improved mechanical seat lock comprising:
   an elongated housing;
   at least one bushing in the housing, each bushing having a generally cylindrical inner surface;
   a rod having a generally cylindrical outer surface, the rod extending through the bushing and at least partially through the housing, the inner surface of the bushing support the rod for translation partially out of the housing;
   at least one locking spring within the housing, around the rod and adjacent the bushing, the normal inside diameter of each locking spring being less than the outside diameter of the rod and moveable to an uncoiled orientation having a diameter at least slightly greater than the outside diameter of the rod; and
   the outer surface of the rod and the inner surface of the bushing having means for limiting rotational movement of the rod.

8. An improved mechanical seat lock as claimed in claim 7, wherein:
   the outer surface of the rod has at least one flat portion that extends longitudinally along the rod; and
   the inner surface of the bushing has at least one flat area that engages the flat portion to limit rotational movement of the rod.

9. An improved mechanical seat lock as claimed in claim 7, wherein:
   the outer surface of the rod has two flat portions that extend longitudinally along the rod; and
   the inner surface of the bushing has two flat areas that engage the flat portions to limit rotational movement of the rod.

10. An improved mechanical seat lock as claimed in claim 9, wherein:
    the flat portions are formed on the outer surface of the rod approximately 180° from each other; and
    the flat areas are formed on the inner surface of the bushing approximately 180° from each other.

11. In a mechanical lock comprising a housing, a generally cylindrical rod having a first end extending into the housing and a second end extending out of the housing, the rod having a longitudinal axis and an outer surface, a bushing in the housing, the bushing including (1) a central axial bore having an inner diameter slightly greater than an outer diameter rod so that the rod may be passed through the bore, and (2) an inner surface created by the bore, a locking spring having coils extending around a portion of the rod, the normal inside diameter of the locking spring being less than the outside diameter of the rod so that the locking spring grips the rod, and a lever connected to the locking spring for uncoiling the locking spring to increase its inside diameter sufficiently to allow the locking spring to release the rod, the improvement comprising the provision of:

flat portions on the outer surface of the rod extending along the longitudinal axis for substantially the length of the rod, and flat areas on the inner surface of the bushing that align with the flat portions of the rod when the rod passes through the bore.

12. In the mechanical lock of claim 11, wherein:

the flat portions are formed on the outer surface of the rod approximately 180° from each other; and the flat areas are formed on the inner surface of the bushing approximately 180° from each other.

13. In the mechanical lock of claim 11, wherein:

the locking spring has an inner surface that contacts the outer surface of the rod, and flat areas on the inner surface of the spring align with the flat portions of the rod when the rod passes through the spring.

* * * * *

UNITED STATES PATENT AND TRADEMARK OFFICE
CERTIFICATE OF CORRECTION

PATENT NO.     : 6,164,419
DATED          : December 26, 2000
INVENTOR(S)    : Kevin N. Tribbett It is certified that error appears in the above-identified patent and that said Letters Patent is hereby corrected as shown below:

Column 6,
Line 18, replace "rod" with -- bushing --.
Line 24, replace "spring" with -- bushing --.

Column 8,
Line 14, replace "spring" with -- bushing --.

Signed and Sealed this

Fifth Day of April, 2005

JON W. DUDAS
*Director of the United States Patent and Trademark Office*